May 16, 1967

R. H. MIX 3,320,591

METERING SYSTEM RESPONSIVE TO INTERROGATIONS
FROM A CENTRAL STATION

Filed Dec. 13, 1962

INVENTOR
ROBERT H. MIX

BY

ATTORNEYS

INVENTOR
ROBERT H. MIX

ATTORNEYS

May 16, 1967 R. H. MIX 3,320,591
METERING SYSTEM RESPONSIVE TO INTERROGATIONS
FROM A CENTRAL STATION
Filed Dec. 13, 1962 5 Sheets-Sheet 5
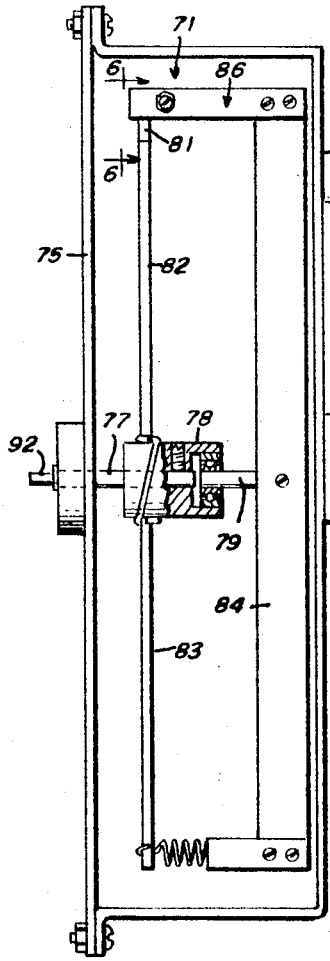
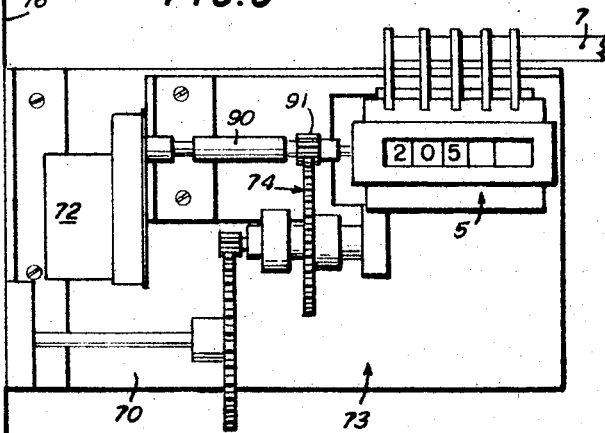
FIG.5
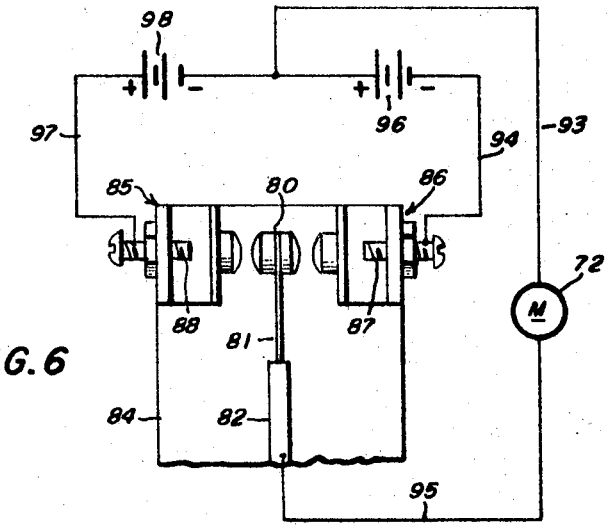
FIG.6
INVENTOR
ROBERT H. MIX
BY
ATTORNEYS United States Patent Office 3,320,591
Patented May 16, 1967

3,320,591
METERING SYSTEM RESPONSIVE TO INTER-
ROGATIONS FROM A CENTRAL STATION
Robert H. Mix, Central Valley, Calif., assignor to the United States of America as represented by the Secretary of the Interior
Filed Dec. 13, 1962, Ser. No. 244,532
11 Claims. (Cl. 340—152)

The invention herein described and claimed may be manufactured and used by or for the Government of the United States of America for governmental purposes without the payment of royalties thereon or therefor.

This invention relates to improvements in a signaling system wherein audio signals are produced in accordance with data manifestations provided to the system by a measurement sensing mechanism. More specifically, the mechanism senses changes in natural or created phenomenon, and in response thereto controls a drive to a registering counter in which rotational displacements are converted to digital settings indicative of the changes sensed. By reading out these counter settings through sequentially controlled electrical sensing means, there are provided coded signals for operating an audio signal producing apparatus whose output is connected to a radio telemetering means. Particular utility for this invention is found in radio reporting systems that are used to collect at a central station, various kinds of data originating in remote areas. Such systems are applicable for gathering information pertaining to such phenomena as rainfall, temperature, humidity, or the stage levels in streams and rivers.

Typical of the structure in an apparatus suitable for detecting and measuring predetermined conditions at remote areas, is the presence therein of an element made operative to rotate through an angle corresponding to the measurement of the condition detected. For the purposes of the present invention this rotatable element is in turn made effective to set numerical data on the indicator or value setting wheels of a readout registering counter. To facilitate a readout each of the counter's denominational orders has associated therewith an ordinal set of digital contacts across which brush-like contact arms are swept as they are positioned together with the denominational indicator wheels of the counter. It is by means of these contacts and contact arms of the counter, that circuits are completed through various relays and switching devices, to become effective to provide a timed pulse output signal to a tone pulse oscillator circuit having associated therewith a radio transmitter. Previous systems of this type have had operational difficulties arising out of the fact that the intelligence they produced was in the form of very short duration pulses. Such pulses did not lend themselves to achieving a complete modulation of the output from frequency modulation transmitters generally used in connection with these reporting systems. Further, these transmitted signals must also pass through a radio repeater which presents additional modulation problems. In such other systems, the information received at the central station, was ordinarily viewed on an oscilloscope which required an operator having special training in its use and the interpretation of its readings. Moreover, accurate reading of pulse patterns on an oscilloscope is difficult during periods of low signal to noise ratio since noise appears on the oscilloscope as random pulses or "grass" which at times are nearly as large as the data pulses. By means of the present invention, most of these difficulties are overcome since the intelligence is transmitted in the form of pure audio tones digitally coded to correspond to the data as sensed for input to the system, that may be easily recognized and understood.

It is therefore an object of the present invention to provide a system for converting data on environmental conditions sensed at one location, into coded intelligence formed as tone pulses, and transmitting this intelligence in such form to a distant location.

Another object of the present invention is to provide an electromechanical system responsive to input signals corresponding to angular displacements representing data, for producing equivalent information as tone pulses for radio transmission.

It is also an object of the present invention to provide a time sequenced electrical circuit for reading out data corresponding to the settings on the numeral wheels of a counter, and translating the data obtained into tone pulses.

A further object of the present invention is to provide a data sensing and translating system having multiple channels for processing a number of different types of information, to form distinct trains of coded tone pulses for each such channel.

These and other objects and advantages of the invention will be more clearly understood from the following description of a preferred embodiment of the invention, when considered together with the accompanying drawings wherein:

FIG. 5 is a plan view of a data input apparatus for use with the circuits of FIG. 2, including the details of a torque amplifier; and FIG. 6 is a fragmentary view of a portion of FIG. 5, revealing the details of a directional control switching structure.

Figure 1:
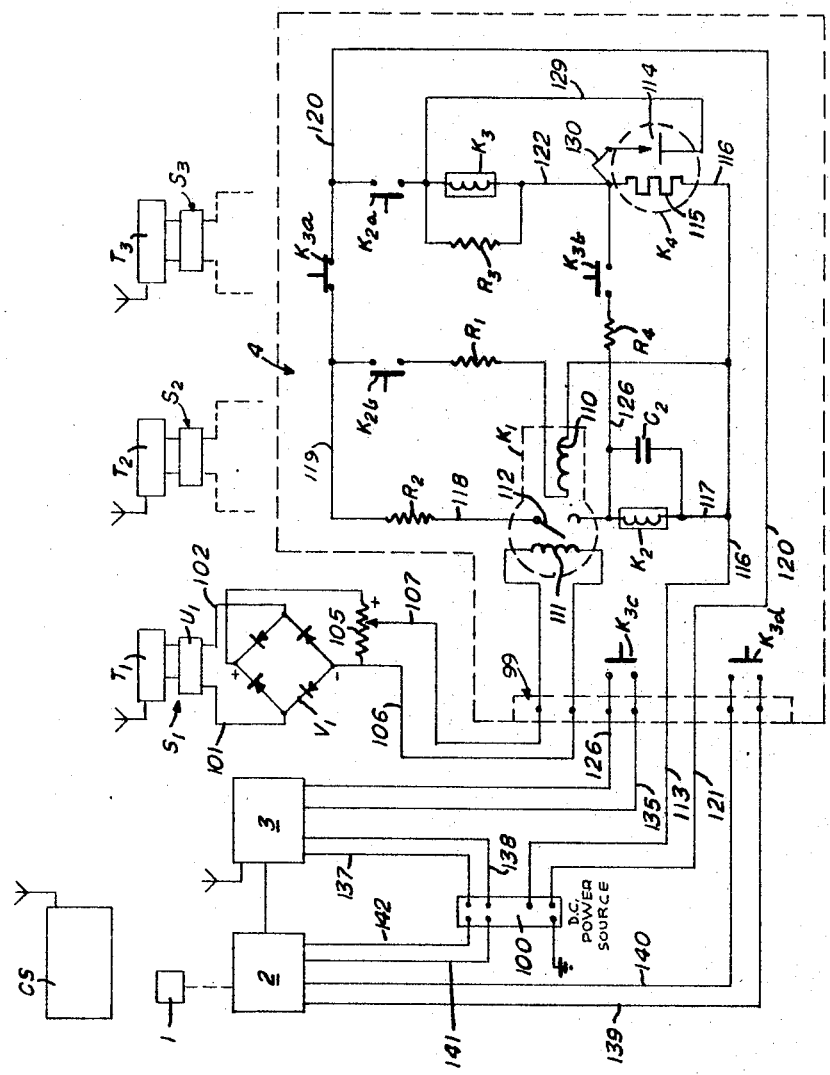
FIG. 1 is a diagrammatic representation of the overall signaling system including a schematic wiring diagram of an operation-initiate circuit at an individual remote station of the system.

As diagrammatically shown in FIG. 1, the signaling system according to the invention comprises a plurality of remote data measuring and sensing stations $S_1$, $S_2$, $S_3$, etc., each such station being in radio communication with a central control station or data processing center CS. According to the arrangement of the preferred embodiment, the remote stations may be variously located at between 35 to 95 miles from the central station, with extensions of the range being readily feasible as the need arises. Since the pertinent equipment at each of the plurality of remote stations is constructed and arranged for operation in substantially the same manner, a disclosure thereof is made by referring in the main to the one station $S_1$, shown in partial detail in FIG. 1. Initiation of a tone code pulse readout at the station $S_1$ depends on a signal of a predetermined frequency originating at the central station CS, and transmitted from its antenna for detection by radio receivers $T_1$, $T_2$, $T_3$, etc., located at the individual remote stations. As is the practice at all remote stations, the station $S_1$ radio receiver T is operated continuously so as to be effective at all times to detect signals from central station CS, and to supply any meaningful output signal produced thereby, to a conventionally designed bandpass filter $U_1$, tuned to pass only such signals it receives, that are of the predetermined frequency assigned to the station $S_1$. In the same way, any of the other individual remote stations $S_2$, $S_3$, etc., in the network may be selectively interrogated by an audio tone pulse of the predetermined frequency assigned thereto. Interrogations are made as often as required by the known factors considered critical in connection with the data to be obtained. For example, the interrogation for rainfall or river level data, would normally depend on the prevailing weather conditions, such that during good weather an operator at the central station would signal for a reading as infrequently as once a day, and as often as every one-half hour during the periods of heavy rainfall.

Assuming the signal from central station CS received at station $S_1$, corresponds to that to which this remote station is tuned, its filter $U_1$ is made operative thereby to supply an output on leads 101, 102, to a full wave rectifier $V_1$. A potentiometer 105, connected across the output of the rectifier $V_1$, cooperatively relates the rectifier to an operate-initiate and timing circuit 4. Circuit 4 receives on leads 106, 107, connected to a terminal strip 99 thereof, a current at low voltage, which energizes an operate coil 111 in a sensitive relay $K_1$, of the type having a permanent magnet fixed contact and a solenoid reset. Closure of the relay $K_1$ contacts 112, by its operate coil 111, makes effective a circuit for activating a multicontact relay $K_2$. This circuit is completed through leads 113, 116, 117, 118, 119, normally closed contacts $K_{3a}$, and further leads 120, 121, which supplies power from a D.-C. source 100, to the coil of relay $K_2$ and a capacitor $C_2$ connected across the coil, as well as to a voltage limiting resistor $R_2$ in series therewith. Closure of the respective contacts $K_{2a}$ and $K_{2b}$ following energization their relay coil, applies power from the source 100, through leads 113, 116, 122, 120, 121, to a first circuit comprising the operate coil of another multicontact relay $K_3$, a resistor $R_3$ connected across the relay coil, a resistance heating coil 115 of a timing relay $K_4$, and through further leads 124, 125, to a second circuit comprising a coil 110 of the reset solenoid in relay $K_1$, and a voltage limiting resistor $R_2$. Consequently, the relay $K_1$ is reset by the solenoid 110 positively driving open its relay contacts 112, and relays $K_3$ and $K_4$ are energized to condition their contacts for actuation. Activation of relay $K_3$ causes its normally closed contacts $K_{3a}$ to be drawn open, and its normally open contacts $K_{3b}$, $K_{3c}$ and $K_{3d}$ to be pulled closed. Although the energizing circuit for relay $K_2$ is opened at contacts 112, the relay is momentarily maintained energized by capacitor $C_2$ discharging across the relay coil in parallel therewith, whereby relay contacts $K_{2a}$ remain closed for a time interval of sufficient duration to allow the activation of relay $K_3$ to close its contacts $K_{3b}$. In this manner, activation of relay $K_2$ is continued in an energizing circuit completed through lead 126, resistor $R_4$, the closed contacts $K_{3b}$, lead 122, the coil of relay $K_3$, closed contacts $K_{2a}$, and leads 120, 121. Relay $K_4$ whose function in the circuit is primarily that of an operational timer, is comprised of elements assembled in an evacuated and sealed envelope. A timing control is provided by the use of relay $K_4$, in the action of its normally-open bi-metallic contact device 114, which is made operative to close its contact gap only after a predetermined period of heating provided thereto by the resistance heating coil 115 assembled adjacent the contact device, but isolated therefrom.

Closure of the relay $K_3$ contacts $K_{3c}$ and $K_{3d}$, in the manner hereinbefore explained, initiates the requisite operations in a tone pulse coder apparatus 2, and a radio transmitter 3. The coder apparatus comprises data processing circuits which according to the present invention, are operatively responsive to an input drive from a detecting and measuring device 1. The circuit completed through contacts $K_{3c}$ comprises leads 135, 136, which through further leads 137, 138 connect the power source 100 to a keying or operate relay in the radio transmitter 3. Similarly, a circuit completed through contacts $K_{3d}$, and leads 139, 140, are effective to establish a power circuit comprising leads 141, 142 from the source 100 to a principal operate relay in the coder apparatus 2.

Adequate time to accomplish a complete data read-out and transmission from the coder apparatus 2, and transmitter 3 is made available by the timing control obtained in the operation of relay $K_4$. Current passing in the circuit comprising the relay $K_4$ heater resistor coil 115, also energizes the operate start relay $K_3$, whereby there is initiated the operational sequence for the data read-out and transmission. Thereafter the operations continue without interruption until heater resistor coil 115 produces sufficient heat in the relay $K_4$ to cause the bi-metal elements of contacts 114, to be brought into conductive contact. A circuit completed by the closed contacts 114, and traceable through power lead 116, resistor coil 115, terminal jumper 130, lead 129, closed contacts $K_{2a}$ and the power return lead 120, becomes effective to short or by-pass the relay $K_3$. The ensuing deenergization of relay $K_3$ allows its contacts $K_{3b}$ to open and interrupt the energizing circuit to relay $K_2$. When as a result the relay $K_2$ contacts $K_{2a}$, and $K_{2b}$ are also allowed to open, all pertinent control elements of the initiate operate circuit 4 become ineffectual, and they are restored to their normal inoperative state. The resistor $R_4$ is provided in the circuit connecting relay $K_2$ and its capacitor $C_2$, across resistor coil 115, to protect the latter from any overload following the short circuiting of the load normally associated therewith. The rating for resistance $R_3$ is specified to achieve a suitable time interval in which the operational sequence of the apparatus may be completed. This timing control follows from the effect of resistance $R_3$ in the series circuit comprising the heater resistor coil 115, whereby the current made available to heat the resistance 115, is determined by the total resistance in the circuit. A time interval of about 120 seconds was found appropriate for a preferred embodiment wherein four digit numerical data was read-out and transmitted.

Figure 2:
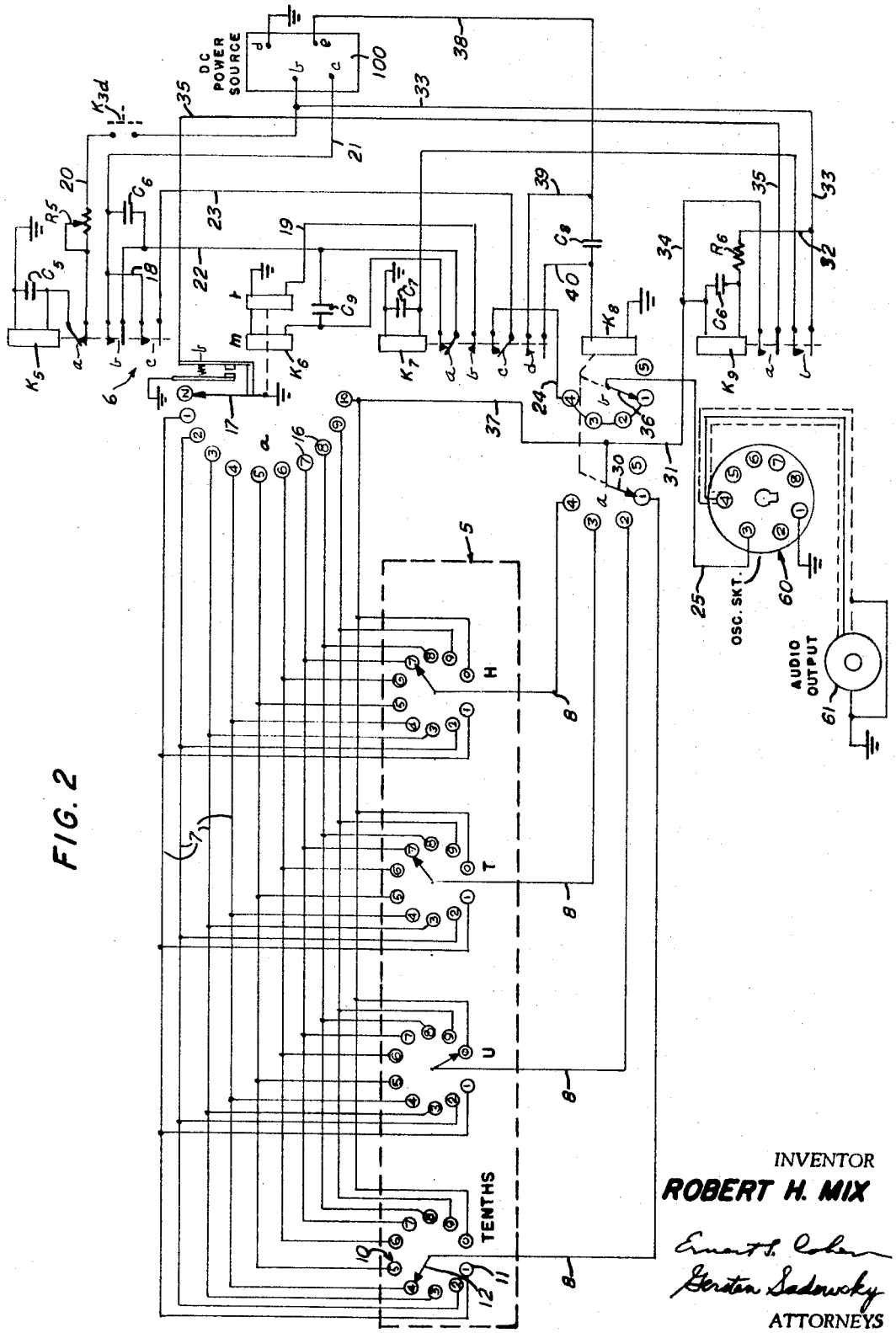
FIG. 2 is a schematic wiring diagram illustrating the data processing circuits as arranged in a preferred embodiment of the present invention.

Referring now to the schematic diagram of FIG. 2, there is found disclosed there the principal data processing structure of the present invention as generally including a data readout register 5, readout control circuitry 6, and two sets of electrically conductive leads 7 and 8, operatively interrelating in an over-all circuit the readout register with the control circuitry. As indicated in the figure, the data readout register 5, comprises denominational order counter wheels (not shown), having associated therewith a bank of ten position rotary switches, ganged together to rotate in a progressive 10–1 ratio. As will be hereinafter explained, a master input shaft drives the lowest order wheel as directed by its coupling to an information producing arrangement. A rotary switch is adjacent a counter wheel in each of the four denominational orders of the register 5, and comprises a ring 10 of electrically conductive segments or contacts 11, fixed in a spacial arrangement corresponding to that of the digital indications on the counter wheel. The ten conductive segments in each ring 10, are evenly spaced about the counter wheel's rotative axis, and are located thereby so as to be contacted in sequence by an electrically conductive arm 12, rigidly attached to the related counter wheel and positionable therewith according to the numerical value input set upon the register 5. Leads 7 providing connections between the register 5 and the circuitry 6, comprise a set of parallel circuits wherein each individual lead has joined thereto at the register, only the contacts of the same digital value from each of the register's denominational orders. Leads 8, providing the further connections between the register and the control circuitry, are individually connected by brushes or the like, to the respective rotatable contact arms 12 in each of the register's denominational orders. As illustrated in FIG. 2, the register's ordinal counters and their electrical switching elements 11 and 12, are merely representative of a suitable conventional data readout mechanism, which may take the form of any one of many known to the prior art, such as that disclosed in U.S. Patent No. 2,620,980, issued to R. E. Brown on Dec. 9, 1952.

Control circuitry 6 is essentially a means to provide an over-all timing control for the register readout procedure. It is made operative to determine the sequence in which the data of register 5 will be read out, and in addition includes means to set the duration of the pulses being produced in accordance with the readout, and the spacing time allotted between these pulses. A rotary stepping switch $K_{6a}$ of the circuitry 6, provides by means of its array of ten digitally related electrical contacts 16, an appropriate set of terminals to which the corresponding digitally designated leads 7 from the register 5, are joined. Switch $K_{6a}$ is equipped with an electrically conductive scanning arm 17 arranged to be stepped from contact 16 to the next by an electromagnetic drive from a motor winding $m$ in the associated relay device $K_6$. Also provided in the relay device $K_6$ is a release winding $r$ which when energized separately, functions to restore the scanning arm 17 to its home position on a neutral contact N of the rotary switch $K_{6a}$. Relay device $K_6$ comprises one other switch element $K_{6b}$ which is maintained open circuited by an extension on the arm 17, only when the latter is on the contact N of the rotary switch, for a purpose to be hereinafter explained.

Circuitry 6 further comprises a relay operated component $K_5$, which provides a master timing and pulse forming control for the functions of relay device $K_6$. The operate coil of relay device $K_5$ in a parallel circuit with a condenser $C_5$, has joined thereto a series circuit comprising an adjustable resistance $R_5$ and a source of D.-C. power $100b$. Completion of this series circuit through ground, the relay's normally closed contacts $K_{5a}$, and a lead 20, causes the condenser $C_5$ to start charging. When after a short time the condenser $C_5$ is sufficiently charged, the coil of relay device $K_5$ is energized thereby. Thus made operative, the relay opens its contacts $K_{5a}$, and closes its contacts $K_{5b}$, and $K_{5c}$. Opening of the contacts $K_{5a}$, initiates an "on" time period whose duration is measured by the interval of time required for the condenser $C_5$ to discharge through the relay coil until it reaches the de-energizing voltage of the relay. Adjustment of resistance $R_5$ determines the charging time of the condenser, which in turn defines the "on" time interval, or the time during which relay $K_5$ is held operated after its contacts $K_{5a}$ are opened. Following the de-energization of the relay $K_5$, and the subsequent reclosure of its contacts $K_{5a}$, there occur further repeated cycles of operational timing control achieved in the manner hereinabove described. The durations of the "on" and "off" times are dependent upon the ratings of elements $C_5$ and $R_5$, as well as the adjustment made on element $R_5$. The rating of element $C_5$ effectively determines the "on" time, and the rating of element $R_5$ defines the range of the "off" time. Exemplary timing control suitable for the operation of the instant embodiment would be approximately one-half second "on," and about the same time "off."

Reacting to the timed pulsing in the coil of the relay device $K_5$, the contacts $K_{5b}$ in a series circuit comprising leads 21 and 22, a normally closed relay contact $K_{7a}$, a source of power $100c$, and the motor coil $m$ of the stepping relay $K_6$, makes available a pulsating drive for the switch structure $K_{6a}$. Condensers $C_9$ and $C_6$ connected across the relay contacts $K_{7a}$, and $K_{5b}$ of the stepping switch circuit, act as spark suppressors in a known manner. An audio tone keying circuit comprising leads 21, 18, 23, 24 and 25, and through normally closed relay contacts $K_{7c}$, provides connections for an energizing circuit between an oscillator pin socket connector 60, and the time controlled pulsating contacts $K_{5c}$. It is evident from this circuit arrangement that the duration of the tone pulses produced at the audio output means 61, is also determined by the "on-off" control exercised by the elements $R_5$ and $C_5$.

Actuation of relay component $K_6$ advances the contact arm 17 on the rotary switch $K_{6a}$, one step for each timed pulse produced by the operation of relay $K_5$. Movement of contact arm 17 continues until it rests upon that digital contact 16 of the rotary switch to which is also joined the particular lead of the set of leads 7, which has connected thereto the digit contact 11 corresponding to the one upon which rests the arm 12 in that one denominational order selected for operation. As will be hereinafter explained, this ordinal selection is made by a further electrically conductive contact arm 30 of a relay operated rotary switch $K_{8a}$. Control pulses to the motor or stepping coil of relay $K_6$ are stopped when the power source or energizing circuit thereto is interrupted following the operation of a relay $K_9$, which upon closing its contacts $K_{9b}$ in an energizing circuit to the coil of relay $K_7$, effects thereby the separation of the normally closed contacts $K_{7a}$ in the relay $K_6$ stepping coil energizing circuit. Activation of relay $K_9$ following the full digital positioning of the contact arm 17, is accomplished in an energizing circuit completed through ground from the contact arm 17, the digital lead 7 to the associated counter ring contact 11 and its contact arm 12, a lead 8 to the selected ordinal contact on rotary switch $K_{8a}$ and arm 30 thereof, lead 31, a fixed resistance $R_6$, and leads 32 and 33 to the power source $100b$. Resistance $R_6$ functions in this circuit to slow down the contact closing action in relay $K_9$, so that the operational time for the single pulse called for by a registered digit value of one, will be of required length. Closure of contacts $K_{9a}$ locks over the energization circuit for the coil of relay $K_9$ by completing a circuit comprising from the power source $100b$, the leads 32, 33, 34 and 35, and the contacts $K_{6b}$ which remain closed as long as rotary switch conatct arm 17 is displaced from its N or neutral position.

Operation of relay $K_7$ at the conclusion of each denominational digit readout, effects the closure of its contacts $K_{7b}$, and the opening of its normally closed contacts $K_{7a}$. As a result, the next pulse formed by the timed operation of contacts $K_{5b}$, is applied through leads 22 and 19, to the release coil $r$ of relay $K_6$, whereby contact arm 17 is reset to its neutral position N. By coming to its neutral position, the arm 17 directs its extension into engagement with a contact of switch $K_{6b}$, and opens the switch. The locking circuit for relay $K_9$ over its contacts $K_{9a}$, is thus disabled, and the relay is free to de-energize as soon as the charge on the condenser $C_6$ circuited across the relay coil, drops to the de-energizing voltage of the relay. Thereafter, with contacts $K_{9b}$ opened, the coil of relay $K_7$ is permitted to de-energize although such action is delayed until the charge on the condenser $C_7$ across the $K_7$ relay coil, becomes sufficiently low. When relay $K_7$ is restored to normal, its contacts $K_{7b}$ open, and its normally closed contacts $K_{7a}$ close, whereby the timed pulses formed by relay $K_5$ are once again applied to the motor coil $m$ of the relay $K_6$.

The over-all time delay produced as a result of discharging condensers $C_6$ and $C_7$ is significant since it is sufficient to allow approximately five timed pulses to occur without effect in the $K_6$ motor coil $m$. In this manner, a suitable time interval is made available between each denominational digit readout from the counter 5. Moreover, during the reset time following a digit readout, and when relay $K_7$ is energized, the normally closed contacts $K_{7c}$ are open to disable the tone pulse circuit from relay contact $K_{5c}$, and prevent tone pulses from being formed. Energization of relay $K_7$ also effects the closure of its contacts $K_{7d}$, whereby a circuit through leads 38, 39 and 40 is completed and power from source $100c$ is applied to the driving coil of rotary switch $K_8$. Contacting arms 30 and 36 of the rotary switches $K_{8a}$ and $K_{8b}$, respectively, are therefore advanced to the contacts of the next denominational order. Consequently, the next sweep of contact arm 17 across the contacts 16 of the rotary switch $K_{6a}$, will read out with timed pulses the digital value on the contact ring 10 of the next denominational order of the register.

Assuming a four digit number to have been read out from the register, the contact arm 30 is thereafter stepped to the fifth position contact on switch $K_{8a}$. Although this contact does not connect the contact arm 30 in a circuit through any register ordinal contact arm 12, a completed circuit to the pulsing switch $K_{6a}$ is nevertheless made possible through a lead 37 which joins the tenth position contact 16 of the pulsing control switch $K_{6a}$, directly to the contact arm 30. By this means, the pulsing control switch must advance to its tenth position contact before any resetting function may occur. Moreover, the switch $K_{8b}$ which conductively links its first four contact positions, also maintains its fifth position contact open circuited. As a result the audio tone circuit to the oscillator normally completed through any one of the conductively linked contacts, and relay contacts $K_{5c}$ and $K_{7c}$, remains incomplete, and ineffective to form any tone pulses. The ten pulse delay achieved in this manner provides a time interval for separating the digit groups constituting complete numerical values. It is evident that any number of digits may be read out from a data counter having an appropriate number of numeral wheels and associated contact rings, as long as the ordinal switching mechanism is provided with one additional digit position.

In the event the digit set by means of contact elements 11 and 12 of the register is missed by the sweep of arm 17 across switch $K_{6a}$, the aforementioned circuit provided to separate completed numbers, becomes operative to register a value of 10, or a zero digit for the related denominational order when the arm 17 finally reaches the tenth position on the switch. Even though the coded value derived by this means would be lower than when the register value is otherwise correctly read out, this circuit function is nevertheless desirable since it makes the overall circuit safe against a runaway failure. For example, lacking this feature, a set digit contact being missed in the course of a read out operation, would cause the switch $K_{6a}$ to reach the position of the number 10 contact, where it would remain to continue a timed pulsing until the defect was corrected.

Figure 3:
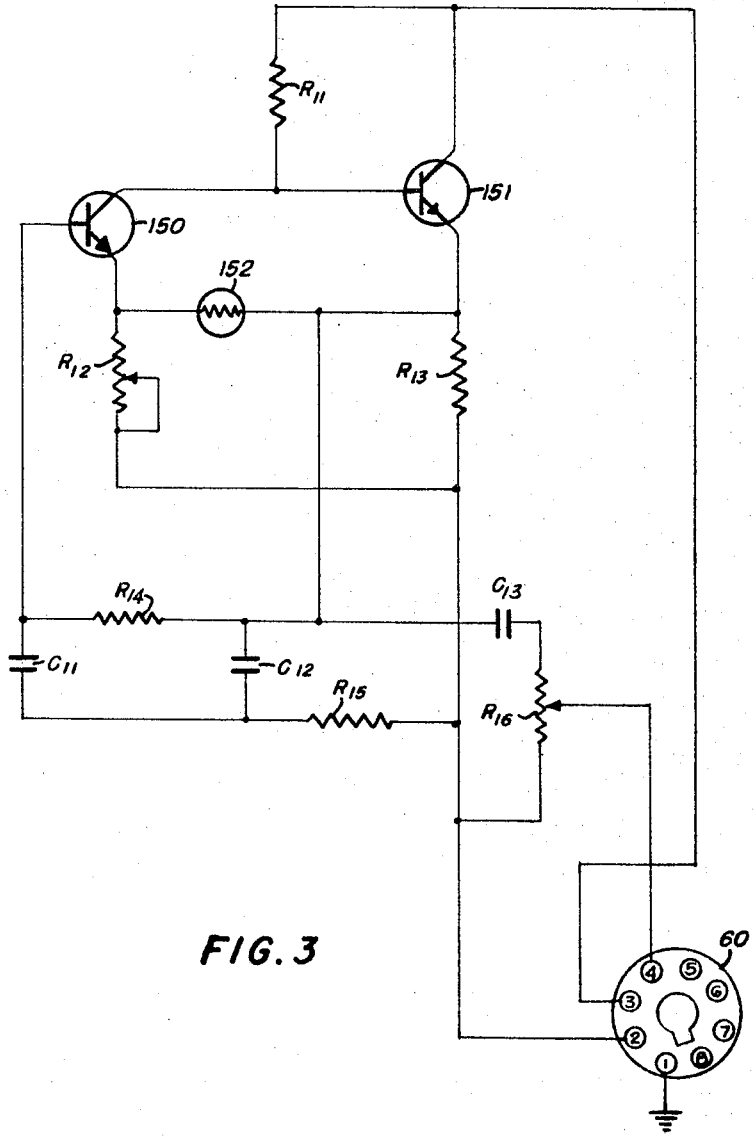
FIG. 3 is a schematic wiring diagram of an oscillator designed for use with the circuits of FIG. 2.

A tone oscillator which would be suitable for connection to plug 60 shown in FIG. 2, may be either a transistor or vacuum tube type, but must be able to produce one or more audio tones in the audio frequency range of 300 to 3000 cycles per second. The transistor oscillator disclosed in FIG. 3, is most appropriate for use in connection with the preferred embodiment, since the power consumed in the circuit shown, would be relatively small. The NPN transistors 150 and 151, operate an emitter coupled amplifier with feedback between the transistors being provided through a notch network comprising capacitors $C_{11}$ and $C_{12}$, and resistances $R_{14}$ and $R_{15}$, wherein the maximum feedback occurs at the notch frequency determined by the notch network elements. Variable resistance $R_{12}$ serves as a waveshape control. Amplitude stabilization is supplied by the action of a thermistor 152, which serves as a variable resistance in the feedback loop. Resistance $R_{11}$ is a collector load for transistor 150, and resistance $R_{13}$ is an emitter load for transistor 151. Output is taken from the emitter of transistor 151 through a D.-C. blocking capacitor $C_{13}$. Adjustable resistance $R_{16}$ serves as an output control to regulate the transmitter modulation amplitude control. Coded pulses are received as operate control input signals to the oscillator from lead 25 shown in FIG. 2, through pin 3 of the connector socket 60, and the oscillator output is supplied through socket pin 4 to the audio output plug 61, also shown in FIG. 2.

When it becomes desirable to transmit more than a single category of data from a particular location where measurements are to be taken, the circuits as shown in FIG. 2, may be modified to accommodate the readout and transmission of data from several registers, as will be hereinafter described with reference to FIG. 4. Two registers $DR_l$ and $DR_t$, designated in FIG. 4, as having five counter wheels, are connected to be read out by a sequential switching circuit including a relay operated twelve pole-double throw sequencing switch $K_{10}$. Leads 60 shown connected to contact segments $K_{10b}$ to $K_{10f}$ of the sequencing relay, are traceable to the separate circuits associated with the respective contact sweep arms of the counter wheels in register $DR_l$. Similar leads 41 traceable to the separate circuits associated with the sweep arms of the five counter wheels in register $DR_t$, are connected to contacts $K_{10h}$ to $K_{10i}$ of the sequencing relay $K_{10}$. The five pivoted relay armatures coacting with contacts $K_{10b}$ to $K_{10i}$, are joined by two sets of five parallel leads 42 and 43, to first and second groups of circularly spaced ordinal position contacts 1 to 5, and 7 to 11, comprising a relay operated rotary switch $K_{8x}$. Contacts $K_{10a}$ and $K_{10g}$ of the sequential relay are connected by leads 44 and 45, to respective audio tone oscillators A and B (not shown), and the relay armature coacting therewith, is connected by way of lead 46 to a contact sweep arm 47 of rotary switch $K_{8y}$, which together with rotary switch $K_{8x}$, are made operative by a relay coil such as that of relay $K_8$ shown in FIG. 2.

Figure 4:
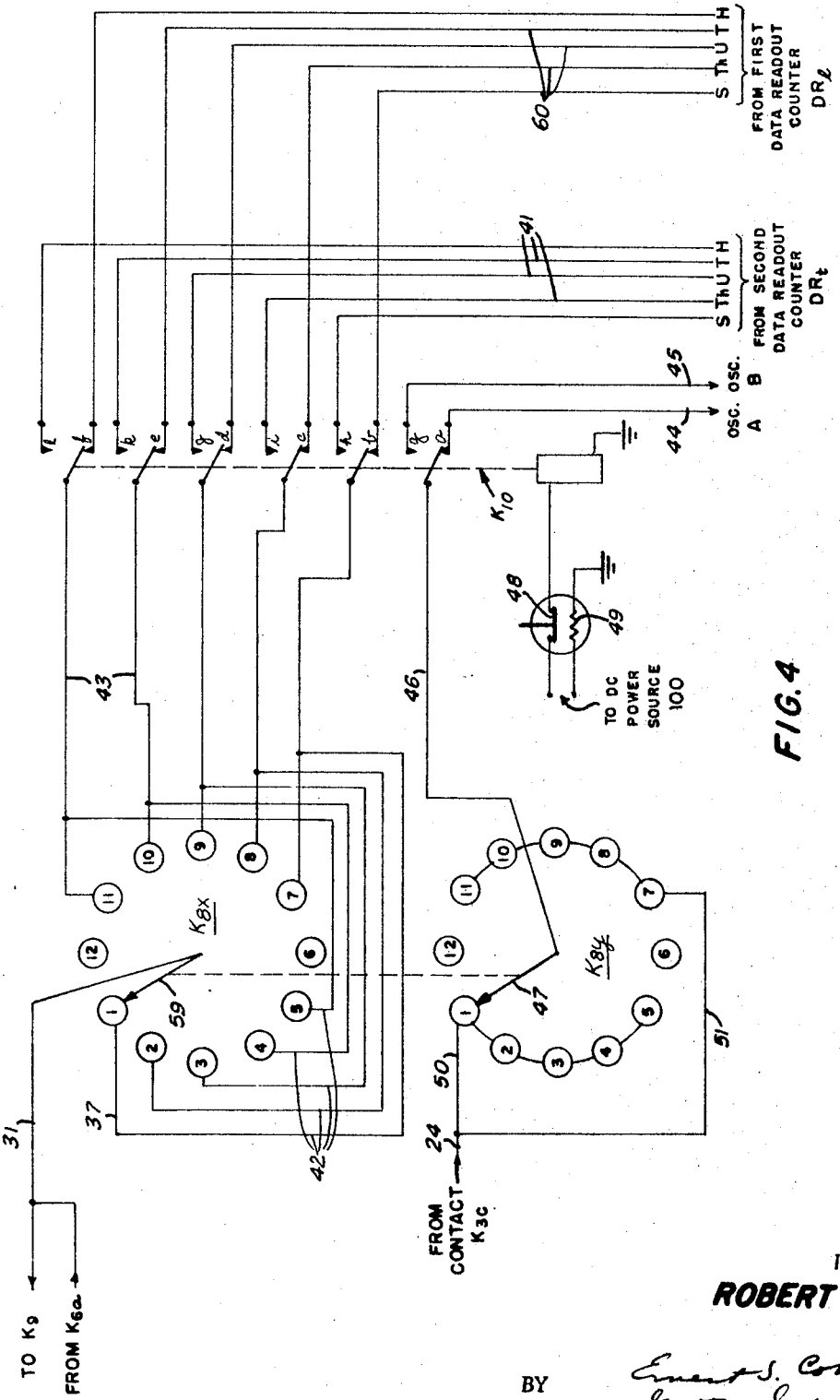
FIG. 4 is a schematic wiring diagram showing a modification of a portion of the circuits shown in FIG. 2.

The sequencing relay $K_{10}$ may be provided with a conventional polarized operating coil which as shown in FIG. 4, is energized from a voltage source in a circuit controlled by contacts 48 in a timer switch 49, which may have a form similar to that disclosed for relay $K_4$. Rotary switches $K_{8x}$ and $K_{8y}$ which function in the manner described in connection with rotary switches $K_{8a}$ and $K_{8b}$ in FIG. 2, each comprise twelve contact segments of which those at contact positions 6 and 12 do not complete circuits for reasons previously indicated in connection with the operation at digital positions 5, on the rotary switches $K_{8a}$ and $K_{8b}$. A sweep contact arm 59 on the rotary switch $K_{8x}$, is connected to leads 37 and 31 also shown in FIG. 2, such that this contact arm is enabled to complete circuits from the selected contact segments in the registers, or from the tenth position contact of switch $K_{5a}$, to energize the coil of the end-of-digit relay $K_9$. Sweep arm 47 of rotary switch $K_{8y}$ coacts with one or the other of two separate continuous contact elements defined by the conductively linked contacts 1 to 5, and 7 to 11, respectively. Leads 50 and 51, traceable from the continuous contact elements, are connected through lead 24 to the contacts $K_{7c}$, as shown in FIG. 2.

By adapting the registers $DR_1$ and $DR_t$ to receive inputs on their respective master shafts in accordance with changes measured at a site, pertaining to flood stage level and temperature, the hereinabove disclosed modified embodiment is made operable to transmit the input data as sequential trains of audio tone pulses. Identification of the transmitted data may be facilitated by disabling the tens-transfer means at an end counter wheel S in each register, and presetting that wheel to a distinguishing code digit which would be transmitted in turn along with the numerical value of the data registered on the other four counter wheels in each register. However, if it is desirable to employ all five counter wheels of the registers for receiving data input, the data items may be distinguished by transmitting them with different audio tones. For this purpose contacts $K_{10a}$ or $K_{10g}$ are made effective by the relay $K_{10}$, to join either oscillator A or B to the rotary switch $K_{8y}$ sweep arm 47, as needed to transmit the readout from registers $DR_1$ or $DR_t$. It is evident that further flexibility may be achieved by using a suitably timed relay operated multi-contact rotary switch in place of the bipole relay $K_{10}$ of FIG. 4, whereby each one of a plurality of registers at a particular station, may be sequentially read out one at a time.

The particular form of condition sensing apparatus needed for initially deriving and supplying the input to the data processing structure previously described, ordinarily depends upon the nature of an intelligence to be transmitted. However, since the driving forces which would be produced by any such apparatus are normally very weak, provision is made to drive the readout register shaft as indicated by the sensing apparatus, through a power coupling mechanism such as the torque amplifier shown in FIGS. 5 and 6. Comprising this mechanism is an elongated support bracket 70, to which are attached a detecting switch device 71, controlling a motor drive follow-up, the data readout register 5 hereinbefore described, a drive motor 72, and a drive transmission assembly 73, including a reduction gear train 74 transmitting the drive from the motor 72 to a rotatable means in switch device 71. Support bracket 70 is secured in place at a location where appropriate connections may be made to the switch device 71, from elements directly controlled by the condition being sensed.

Centrally located in a plate 75 fixed to the open end of a channel-like housing 76, containing the switch device 71, are ball bearings in which is supported a short shaft 77. A connector sleeve 78, is supported within the housing 76 by receiving within an axial opening through one end thereof, the inwardly extended end of shaft 77 held secured in the sleeve by a set screw. Into an enlarged axial opening at the opposite end of sleeve 78, is also fitted ball bearings in which is supported one end of a long shaft 79 passing out of the housing 76 through a bearing in the back wall thereof, and extending into the transmission assembly 73. Supporting the principal coacting element of switch device 71, is a rod-like arm 82, fixed in the outer surface of sleeve 78, and extending radially therefrom. Projecting from the outer end of rod 82 is a thin flexible support 81 in the top of which is secured an electrically conductive pin 80 having two contacting faces. Fixed to the sleeve 78 at a point diametrically opposite to rod 82, is a similar radially extending rod 83. An elongated, bar shaped element 84 is fixed to the shaft 79, which supports the bar within housing 76, by being fastened with a set screw or the like, in a hole passing through a central portion of the bar. As is evident from the showing in FIGS. 5 and 6, bar 84 is positioned on the shaft 79 to be in parallel alignment with the rods and pin support elements of sleeve 78, whereby perpendicularly extending brackets 85 and 86 attached to opposite sides of one end of bar 84 have situated between them the pin 80. Comprising the ends of brackets 85 and 86 are flexible support strips to which are fixed screw type contact points 87 and 88 respectively, normally maintained slightly spaced from the opposite contacting faces of pin 80. A coil spring fixed to the outer end of rod 83, and stretched slightly to permit its atttachment to an adjacent bracket means fastened to the other end of bar 84, prevents any protracted relative displacement between the rods and the bar.

Drive motor 72 is a low speed, reversible drive, D.-C. motor, whose output shaft 90 is coupled directly to the master drive shaft of the data readout register 5. A drive pinion 91 fixed on the output shaft, enables the gear train 74 having a high reduction ratio such as 72 to 1, to drive the shaft 79 when the motor 72 is energized. As best shown in FIG. 5, this motor may be controlled to rotate in either direction as determined by the particular one of the two oppositely poled energizing circuits which is completed through the switch contacts of the mechanism 71. When for example, the torque amplifier of FIGS. 5 and 6 is associated with a scale means sensing rainfall information, the stub end 92 of the shaft 77, is rigidly coupled to an output shaft of the rainfall measuring scales, which rotates one revolution for 72 inches of rainfall. Any significant rotative displacement of the scales shaft, therefore turns the stub end 92 of shaft 77, and the sleeve 78 fixed to the shaft, whereby the rod 82 on the sleeve, shifts its contact pin 80 into engagement with the contact 87. An energizing circuit for the motor 72 is thereby completed through leads 93, 94 and 95 connecting the motor and the D.-C. power source 96. Thus activated, the motor drives its shaft 90, and the shaft of the register 5 coupled thereto, and by means of the pinion 91 on shaft 90, the gear train 74 and the shaft 79 cooperating therewith, are also driven at that time. Rotation of shaft 79 displaces the bar 84 fixed thereto, which acts to draw its contact 86 away from the contact pin 80. If the scales drive is halted at this time, the separation of contacts 80 and 86 is effected and the motor circuit is deenergized, stopping any further drive to shaft 90, the register and the gear train. However, continued rotation of the scales shaft displaces the shaft 77 sufficiently to maintain conductive engagement between contacts 80 and 86, with a possible slight flexing of contact support 81, even though bar 84 is then being advanced by the motor drive. Displacement of the scales shaft with shaft 77 in an opposite direction, would in a substantially similar manner complete and maintain effective an energization circuit for the motor 72, through contacts 80 and 88, and the leads 97, 95, 93, connecting the reversed polarity power source 98 into the circuit. A controlled reverse rotation of the motor and the parts driven therefrom would be accomplished as hereinbefore described for forward rotation. Although the contacts 85 and 86 are adjusted to maintain as little spacing as possible between them and pin contact 80, there is introduced a slight displacement error by the spacing required to avoid their actual contact. However, this error is constant and can be adjusted so as not to change over the entire range of operation. Therefore, if the initial zero reading includes this error, all following readings will include the same error, cancelling out the effect thereof. Reverse rotation for the motor drive is made available to correct overruns in the forward rotation, and is also effective in the event a decrease in reading is called for due to evaporation or leakage in the measuring receptacle. Nevertheless, no "hunting" or "overshooting" of the mechanism occurs because of the very slow speed of the motor and the high gear ratio between the motor and the contacts.

As a general rule the present invention would be adaptable to transmit any measurable data indications which may be converted to angular motion. Temperature information may be transmitted by coupling the data readout register to a bimetallic temperature sensing element, using sutiable linkages and gears. Similarly, humidity information may be transmitted by coupling the data readout register to a humidity sensing device having a displaceable part. River stage level information may be transmitted by passing a cable extending from a float, over a wheel attached to the readout register. In this instance, the wheel should have a circumference equal to the readings desired, such as being equal to 12 inches to give one-tenth foot readings.

Although the preferred embodiment of the present invention has been shown and described herein, it is contemplated that other means such as switching transistors may be used to perform the functions of the relays, and thus eliminate all moving parts and contacts, and that the mechanically driven counter wheels of the readout register be replaced by transistor switching decades. Therefore, it is to be understood that the invention is not limited to the preferred embodiment since it is susceptible to changes in form and detail within the scope of the appended claims.

What is claimed is:

1. In a signaling system having a central information accumulating station comprising a signal transmitter and a signal receiver, a plurality of remote information gathering stations each comprising a signal receiver and a signal transmitter, including an oscillator, supplying processed data to the central station receiver in response to interrogation signals received by said signal receivers at the remote stations from said central station transmitter, the latter being selectively controlled to broadcast signals at predetermined frequencies within a range of frequencies detectable by the remote station receivers, each said remote station also comprising a band-pass filter tuned to pass only particular predetermined frequencies of said range of frequencies, data processing equipment including an operation initiate and timing apparatus having a timer device and switching means, a data detecting and signal coding arrangement comprising a signal coding control circuit, a data readout register having a plurality of date storage components, each said component including an array of numerically related conductive contact elements and a contact scanning means positionable relative to said array in accordance with the information received in said arrangement to complete a circuit connection with an element of said array, means operable in a regular numerically predetermined stepwise sequence to complete transient circuit connections to the conductive elements corresponding to the same number in all said components, and further means sequentially operable for individually connecting to said signal coding control circuit the circuit-connected conductive elements in contact with said contact scanning means of said components, the output signal of said filter being effective to activate said timer device, and said switching means to complete power supply circuits in said arrangement and said transmitter at the remote station whereby said signal coding control circuit is made operative to produce a steady sequence of pulsating outputs to said signal transmitter oscillator corresponding to the number of said transient circuit connections completed to said contact elements, the number of said pulsating outputs produced in reading out each of said plurality of data storage components, as each is connected by operation of said further means, being determined in accordance with the setting of said contact scanning means in each such component, said oscillator thereby being made responsive to the output of the said arrangement whereby it provides signals at audio tone frequencies for transmission as tone coded data representing the information gathered at said remote station, for a period of time determined by the operation of said timer device in said apparatus.

2. In the signaling system of claim 1, the switching means of said operation initiate and timing apparatus comprising a start switch and reset means therefor, said start switch made effective when closed by means responsive to the output of the said filter, to complete a circuit to an energizing source, said circuit comprising a switch operating means made effective by said source to complete energizing circuits for the start switch reset means and a further switch operating means, operation of the latter being effective to complete power input circuits to said timer device and initiating operation thereof, as well as to the said arrangement and said transmitter at the remote station, switch means in said timer device being closed after a predetermined time, to short-circuit said further switch operating means whereby it and consequently the said first mentioned switch operate means are disabled, and the said power circuits are disrupted.

3. In a signaling system having means to sense a changing physical condition and means to form and transmit audio tone pulses, a data processing arrangement comprising means responsive to the operation of said sensing means, and displaced in accordance with the magnitude of the change sensed, a register means, further means responsive to the displacement of the first said responsive means to drive said register means in accordance with the displacement thereof, said register means comprising electrically conductive settable means made operative to assume digital positions set thereon in accordance with the drive to the register means, means for simultaneously deriving first and second trains of evenly spaced and discretely timed signals, electrical circuits including sequentially effective circuit completing means made operable by the signals of said first train, to transmit signals through said settable means in their set digital positions, further electrical circuits comprising a circuit coupling means to direct signals from said settable means through a means made operable thereby to make ineffective the operation of said signal deriving means to transmit signals through said settable means in their digital positions, and electrical switch means normally effective to direct the said second train of signals to the means forming and transmitting audio tone pulses, and ineffective to direct signals of said second train of signals when said signal deriving means is made ineffective.

4. In a signaling system having a plurality of measuring means, each sensing a changing physical condition and having means thereof displaced according to the measurements of the changes sensed, a plurality of audio tone pulse deriving means each producing a different audio tone, a data processing arrangement comprising a plurality of registering means, each registering means being operatively connected to a respective one of said measuring means, and responsive to the displacement of the said means thereof, and driven in accordance with the said displacement, each said registering means comprising electrically conductive settable means made operative to assume digital positions set thereon in accordance with the drive to the said registering means, means for simultaneously deriving first and second trains of evenly spaced and discretely timed signals, electrical circuits including sequentially effective circuit completing means made operatable by the signals of said first train, to transmit signals through said settable means in their set digital positions, further electrical circuits comprising a circuit coupling means to direct signals from said settable means through a means made operable thereby to make ineffective the operation of said signal deriving means to transmit signals through said settable means in their set digital positions, said circuit coupling means comprising a plurality of separate sets of selectively operable electrical circuit connective elements, each of the sets of connective elements being joined by corresponding separate sets of connective circuits to the electrically conductive settable means of respective ones of said plurality of registering means, a multi-contact time sequencing switching means having a plurality of sets of circuit completing switches, each set of switches having contacts in the circuits of a respective set of connective circuits, whereby each set of switches is in turn made operative to complete its associated circuits and to connect one set of selected connective elements with its associated electrically conductive settable means, and said further electrical circuits also comprising further electrical switches normally effective to direct the said second train of derived signals to the plurality of audio tone pulse deriving means, and ineffective to direct signals of said second train of signals when said signal deriving means is made ineffective.

5. In the signaling system of claim 4, said further electrical switches comprising a second plurality of selectable sets of electrical circuit connective elements, wherein the connective elements of each set thereof are conductively linked, said sets being selectable for operation together with said first mentioned sets of electrical circuit connective elements, to direct through a predetermined one of the contacts of one of said plurality of sets of circuit completing switches, the second train of signals to a respective one of said plurality of audio tone pulse deriving means.

6. In a signaling system having means to sense a changing physical condition and means to form and transmit audio tone pulses, a data processing arrangement comprising means responsive to the operation of said sensing means, and displaced in accordance with the magnitude of the change sensed, a register means, further means responsive to the displacement of the first said responsive means to drive said register means in accordance with the displacement thereof, said further responsive means comprising, a drive motor having operatively engaged therewith a rotatable connector element directly coupling the motor to the register, and receiving and transmitting the output drive of said motor, a control device determining the direction of rotation of said motor output to the connector, said control device including a pair of relatively rotatable elements, means on each of the rotatable elements, coacting in one manner to cause the motor output to rotate the connector in direction, and coacting in a second manner to cause the motor output to rotate the connector in the opposite direction, a drive reducing means engaging said rotatable connector and transmitting the motor drive therefrom to a further connector operatively relating the driving reducing and transmitting means to one of said rotatable elements in said control device, the other of said rotatable elements being coupled to the first means responsive.

7. In the signaling system of claim 6, wherein the drive motor is activated by one or the other of oppositely poled electrical energizing circuits, said means on each of the relatively rotatable elements comprising electrical contacts in said energizing circuits, whereby selective closure of contacts in one or the other of the energizing circuits determine the direction of motor rotation.

8. In a signaling system having a means operatively adjusted in accordance with changes detected in a physical condition and means to form and transmit audio tone pulses, a data processing arrangement comprising sensing means responsive to an adjustment of the detecting means to operate switching elements, a bi-directional motor drive means having a directional control circuit including said switching elements, a multi-denominational register device, means coupling the drive from said motor to said register made effective to transmit the directionally controlled drive to the register whereby the count registered in the latter is indicative of the changes detected in the aforesaid condition, electrically conductive settable means in each denominational order comprising digitally disposed contacts and a sweep contact made operative in accordance with the drive to the register to assume a digital position on a disposed contact conforming to the numerical value of the count registered, means for simultaneously deriving first and second trains of evenly spaced and discretely timed electrical signals, a first pulsing means, and a second pulsing means activated by the output pulses of the first pulsing means and made operative thereby to determine the condition of normally open and closed contacts, electrical circuits including first and second sequentially effective circuit completing means, said first circuit completing means comprising an array of contacts equal in number to the several digits in any denominational order of the register plus one, a first stepped contact arm operable to make contact on the said array, one-by-one starting forward at the said one contact and continuing therefrom to the lowest or any higher digital value, and with return to the said one contact, and forward and return stepping devices activating the said contact arm in accordance with pulses selectively supplied thereto from the said first train of pulses, said second circuit completing means comprising first and second sets of contacts each equal in number to the several numerical denominational orders of the register plus one, second and third contact arms operably stepped in one direction to sequentially and cyclically make the contacts one-by-one in the said first and second sets respectively, a further stepping device operable to concurrently activate the said second and third contact arms in accordance with pulses supplied thereto by closure of normally open contacts by said second pulsing means, multiple circuits interconnecting the first and second circuit completing means, the conductive settable means of said register and the first said pulsing means, said multiple circuits being selectively completed through one of said digitally set conductive means in the register, a corresponding digital contact and said first contact arm of said first circuit completing means, and one of said denominational contacts and the said second contact arm of said second circuit completing means to activate the said first pulsing means whereby said second pulsing means is made operative to activate the further stepping device to position the said second and third contact arms to the next contact in sequence on said first and second sets of contacts respectively, further circuit means operatively associated with normally open contacts of said second pulsing means and controlled thereby to selectively switch the said first train of pulses from said forward stepping device of said first circuit completing means to said return stepping device thereof, whereby the said contact arm is driven toward its initial position into contact with the said one contact associated therewith, separable contacts in said circuit means associated with said first pulsing means, being separated to disrupt the said circuit means when the said first contact arm is returned to its initial position whereby the said second pulsing means is made ineffective to activate said further stepping device, and pulses from the said first train of pulses are selectively switched to supply the forward stepping device of said first circuit completing means, a still further circuit completed through normally closed contacts controlled by said second pulsing means, and a contact of said second set of contacts and third contact arm of the second circuit completing means, and made operative thereby to supply the said second train of pulses to activate the means forming and transmitting audio tone pulses, said still further circuit being made ineffective when said normally closed contacts are opened by the operation of the second pulsing means in response to the output of the activated first pulsing means.

9. The signaling system of claim 8, wherein an auxiliary circuit includes a lead from the highest digital contact of said array of contacts comprising the first circuit completing means, to the second contact arm, whereby a circuit is completed to activate the first pulsing means whether or not the sweep arm of an electrically conductive settable means of a denominational order in the register, has made contact with a disposed contact of the order.

10. A data processing arrangement comprising means forming and transmitting audio tone pulses, and a register in which a multiplicity of electrical circuit means are selectively connected in accordance with the operation of said register, means for simultaneously deriving first and second trains of evenly spaced and discretely timed electrical signals including a relay coil operatble to activate one set of normally closed, and two sets of normally open electrical contacts, an energizing circuit for said coil comprising capacitive and resistive elements and completed to a source of power by said set of normally closed contacts, wherein a predetermined charge accumulated in said capacitive element activates said coil to open said normally closed contacts, and close said normally open contacts during an interval in which said capacitive element discharges through said coil, whereupon said coil deactivates as a lesser predetermined charge is reached in said capacitive element to return said sets of contacts to their normal condition, an electrical switch means having operate means in a circuit including one of said sets of normally open contacts and sequentially made operable from an initial ineffective position by the signals of said first train to complete a selected circuit through said connected electrical circuit means in said register, said power source, and further electrical circuit means comprising means to make ineffective said signal deriving means for making operable said electrical switch means to complete a selected circuit through said connected electrical circuit means in said register, and a circuit coupling means made effective by completion of a circuit through said connected electrical circuit in said register to activate said means to make ineffective said signal deriving means, and further electrical switch means in a circuit including the other set of normally open contacts, said further electrical circuit means being effective to direct the said second train of signals to said means forming and transmitting audio tone pulses, and ineffective to direct said second train of signals when said signals deriving means is made ineffective.

11. The data processing arrangement of claim 10, wherein said means to make ineffective said signal deriving means comprises a further relay coil operable to activate two further sets of normally open contacts, a first energizable circuit including said source of power, one of said further sets of normally open contacts, said further relay coil, and a set of normally closed contacts in said sequentially operable electrical switch means, said latter set of contacts being opened only when said sequentially operated switch means is in said initial, ineffective condition thereof, a second energizable circuit including said source of power, the other of said further sets of normally open contacts and a still further relay coil, said sequentially operated switch means comprising an operate coil and a reset coil operable to return said sequentially operated switch means to said initial ineffective condition, activation of said still further relay coil being effective to suspend operation of said operate coil, and to activate said reset coil of said sequentially operated switch means such that energization of said further relay coil by closure of said further set of normally open contacts in said second energizable circuit activates said first energizable circuit to lock over the latter through said further relay coil, and activates said second energizable circuit to energize said still further relay coil whereby the operation of said sequentially operated switch operate coil is suspended and the said reset coil thereof returns said sequentially operated switch to said initial ineffective condition to effect opening of said normally closed contacts thereof and deactivate said first energizable circuit.

References Cited by the Examiner
UNITED STATES PATENTS

| | | | |
|---|---|---|---|
| 2,081,684 | 5/1937 | Stoddard | 340—150 |
| 2,314,720 | 3/1943 | Leathers | 340—150 |
| 2,344,254 | 3/1944 | Leathers | 340—150 |
| 2,419,487 | 4/1947 | Dresser | 340—151 |
| 2,555,166 | 5/1951 | Uehling | 340—187 |
| 2,591,617 | 5/1952 | Savino | 340—150 |
| 2,719,284 | 9/1955 | Roberts et al. | 340—151 |
| 2,760,131 | 8/1956 | Braunagel | 340—187 |
| 2,942,243 | 6/1960 | Bilz | 340—150 X |

NEIL C. READ, *Primary Examiner.*

H. I. PITTS, *Assistant Examiner.*